(12) United States Patent
Moriwaki

(10) Patent No.: US 7,904,052 B2
(45) Date of Patent: Mar. 8, 2011

(54) SENSOR NET MANAGEMENT METHOD

(75) Inventor: Norihiko Moriwaki, Hachioji (JP)

(73) Assignee: Hitachi, Ltd., Chiyoda-ku, Tokyo (JP)

( * ) Notice: Subject to any disclaimer, the term of this patent is extended or adjusted under 35 U.S.C. 154(b) by 916 days.

(21) Appl. No.: 11/794,673

(22) PCT Filed: Feb. 23, 2005

(86) PCT No.: PCT/JP2005/003420
§ 371 (c)(1),
(2), (4) Date: Jul. 3, 2007

(87) PCT Pub. No.: WO2006/090480
PCT Pub. Date: Aug. 31, 2006

(65) Prior Publication Data
US 2009/0210075 A1 Aug. 20, 2009

(51) Int. Cl.
*H04B 1/16* (2006.01)
*G08B 1/08* (2006.01)
(52) U.S. Cl. .................. 455/343.4; 340/539.3
(58) Field of Classification Search .................. 455/500, 455/502, 507, 574, 343.1, 343.2, 343.4; 340/539.1, 340/539.14, 539.22, 539.3
See application file for complete search history.

(56) References Cited

U.S. PATENT DOCUMENTS

| | | |
|---|---|---|
| 6,628,208 B1 | 9/2003 | Morosumi et al. |
| 6,940,831 B1 | 9/2005 | Omi et al. |
| 7,447,526 B2 * | 11/2008 | Kim et al. ..................... 455/574 |
| 2004/0249563 A1 | 12/2004 | Otsuki et al. |
| 2005/0099289 A1 * | 5/2005 | Arita et al. ................. 340/539.1 |

FOREIGN PATENT DOCUMENTS

JP  02-244827  3/1989

(Continued)

OTHER PUBLICATIONS

International Search Report of PCT/JP2005/003420 mailed Jun. 28, 2005.

(Continued)

*Primary Examiner* — Nguyen Vo
(74) *Attorney, Agent, or Firm* — Stites & Harbison, PLLC; Juan Carlos A. Marquez, Esq.

(57) ABSTRACT

There is provided a sensor node management method in which a user is unconscious of a service break even when a sensor node has failed among a plurality of sensor nodes assuming intermittent operation. Moreover, it is possible to provide a flexible sensor node management method capable of freely modifying the observation grading (space, time) in accordance with a user's desire. A base station (30) for containing a plurality of intermittently operating sensor nodes includes a sensor management table (4) for managing the sensor nodes, a group management table (5) for grouping a plurality of sensor nodes, and an operation timing control unit (3). The operation timing control unit (3) decides the operation interval and the relationship for starting each of the sensor nodes. Moreover, the base station and the sensor node have a counter value as a reference of the sensor node operation interval and the operation start phase, which are periodically synchronized.

8 Claims, 17 Drawing Sheets

FOREIGN PATENT DOCUMENTS

| | | |
|---|---|---|
| JP | 09-294099 | 11/1997 |
| JP | 10-136436 | 5/1998 |
| JP | 2000-020868 | 6/1998 |
| JP | 2000-215377 | 1/1999 |
| JP | 11-341175 | 12/1999 |
| JP | 2001-223716 | 8/2001 |
| JP | 2003-122796 | 10/2001 |
| JP | 2003-141661 | 11/2001 |
| JP | 2003-141662 | 11/2001 |
| JP | 2004-062510 | 7/2002 |
| JP | 2004-163218 | 6/2004 |

OTHER PUBLICATIONS

Jason Hill et al., "The Platforms Enabling Wireless Sensor Networks", Communications of the ACM, vol. 47, No. 6, Jun. 2004, pp. 41-46.

Wendi Rabiner Heinzelman et al., "Energy-Efficient Communication Protocol for Wireless Microsensor Networks", 2000 IEEE, Proceedings of the Hawaii International Conference on System Sciences, Jan. 4-7, 2000, pp. 1-10.

Office Action from Japanese Patent Office mailed Mar. 9, 2010, in Japanese and English.

* cited by examiner

SENSOR NODE MANAGEMENT TABLE (5)

| NODE ID (510) | STATUS (520) | OBSERVATION INTERVAL (530) | START SLOT (540) | GROUP ID (550) |
|---|---|---|---|---|
| #1 | OPERATING | 60 | 0 | #1 |
| #2 | OPERATING | 60 | 30 | #1 |
| #3 | OPERATING | 30 | 0 | #2 |
|  |  |  |  |  |

FIG. 10

GROUP MANAGEMENT TABLE (6)

| GROUP ID (610) | NODE ID (620) | OBSERVATION INTERVAL (630) | NUMBER OF NODES (640) |
|---|---|---|---|
| #1 | #1,#2 | 30 | 2 |
| #2 | #3 | 30 | 1 |
|  |  |  |  |
|  |  |  |  |

FIG. 11

SENSOR NODE MANAGEMENT TABLE (5-1)

| NODE ID (510) | STATUS (520) | OBSERVATION INTERVAL (530) | START SLOT (540) | GROUP ID (550) |
|---|---|---|---|---|
| #1 | STOPPED | -- | -- | #1 |
| #2 | OPERATING | 30 | 0 | #1 |
| #3 | OPERATING | 30 | 0 | #2 |
|  |  |  |  |  |

*FIG. 13*

GROUP MANAGEMENT TABLE (6-1)

| GROUP ID (610) | NODE ID (620) | OBSERVATION INTERVAL (630) | NUMBER OF NODES (640) |
|---|---|---|---|
| #1 | #2 | 30 | 1 |
| #2 | #3 | 30 | 1 |
|  |  |  |  |
|  |  |  |  |

*FIG. 14*

SENSOR NET MANAGEMENT METHOD

TECHNICAL FIELD

This invention relates to a technique of using information sent from multiple sensors connected to a network.

BACKGROUND ART

In recent years, there has been an increasing demand for a sensor network in which real-world information is obtained using sensors and used at a remote location through the network. Existing Internet services are limited to virtual-space services. The sensor network essentially differs from the current Internet in that the sensor network is integrated with a real space. When integration with a real space can be achieved, various services dependent on situations such as time and location can be realized. Traceability is realized by connecting a variety of objects existing in the real space to the network, thereby making it possible to meet social needs for "safety" in a broad sense, needs for efficient inventory control work, and other needs. The sensors directly monitor a real space in terms of the temperature, the degree of soil contamination, the number of engine rotation, etc. and obtained data is shared through the network. Further, a physical action can be performed via an actuator or the like.

A key to realizing a sensor network is employing compact wireless nodes as described in "The Platforms Enabling Wireless Sensor Networks" in COMMUNICATIONS OF THE ACM, June 2004/Vol. 47, No. 6, pp. 41 to 46. Compact wireless sensor nodes require no additional wiring (for power lines and communication lines) and no frequent battery replacement thanks to low-power consumption, and can easily be attached to various things or installed at various locations. As an advantage of compact wireless nodes, wide applications are expected as described below. For example, when compact wireless nodes are installed at buildings, plants, or various electronic devices, it will be possible to sense physical quantities, and to perform remote maintenance/monitoring and automatic replenishment of consumables. When multiple sensor nodes are installed in the natural world, it is possible to perform disaster monitoring and environmental monitoring by sensing signs of a landslide, a flood, and a forest fire before those disasters occur.

FIG. 2 shows a configuration of a typical compact wireless sensor node. A compact wireless sensor node 10 requires no power line connected to an external power supply. Instead, the compact wireless sensor node 10 uses, as its own power supply 11, a small battery built in the node itself or a power source obtained from nature, such as solar power generation, to perform data processing and transmission and reception processing. In order to utilize such limited power as effectively as possible, power required for the sensor node needs to be thoroughly reduced. The sensor node 10 includes a sensor 14, a controller 13 realized by a microprocessor for controlling data transmission and reception, and a radio processing unit 12, all of which have minimum capabilities in order to realize power saving. Sensing data processed in the radio processing unit 12 is sent, via an antenna 15, to another sensor node 10 or to a base station that accommodates the sensor node 10.

FIG. 3 shows the timing of intermittent operation characterizing the compact wireless node 10. In FIG. 3, the horizontal axis indicates time and the vertical axis indicates consumed current. The compact wireless node 10 is periodically activated to be in an operating state 220 (sensing and radio processing), and otherwise in a sleep state 230, thereby performing an intermittent operation for reducing standby power consumption. A method of managing a sensor network through clustering to suppress battery power consumption in the sensor network is described in "Energy-Efficient Communication Protocol for Wireless Microsensor Networks", written by Wendi Rabiner Heinzelman et al, IEEE Proceedings of the Hawaii International Conference on System Sciences, Jan. 4 to 7, 2000, Maui, Hi. In the method named Low Energy Adaptive Clustering Hierarchy (LEACH), a group (referred to as cluster) is composed of multiple sensor nodes. From the cluster, one sensor node called a cluster head is selected. The cluster head is always activated to play a representative role to relay data sent from another sensor node in the cluster to another cluster or to a base station. Since the sensor nodes other than the cluster head in the cluster do not need to be always activated, the sensor nodes are activated only at their own timing to send information while in a sleep state at the other periods. Thus, standby power consumption can be saved. The cluster head is not fixed but is dynamically selected from among the sensor nodes in the cluster based on the remaining power, or is selected at random, to balance the power consumption in the cluster. As described above, LEACH aims at improving the lifetime of the entire sensor network by dynamically performing coordination in units of clusters.

Although the sensor network aims at improving the lifetime of the entire sensor network, each sensor node with a simplified configuration does not have a countermeasure against service interruption caused by battery replacement or sensor failure.

In the Internet world, a method called load balance is often used to avoid service interruption. Referring to FIG. 4, a description is given to the load balance of a server for performing processing for a particular purpose. Discussed is a case where a user 120 accesses servers 100-1 to 100-3 for realizing multiple identical processings, via the Internet. A load balancer 140 is provided before the servers 100. The load balancer 140 periodically monitors the operating states and the loads of the multiple servers 100-1 to 100-3, provided thereafter. In response to a request sent from the user 120, the load balancer 140 selects, based on a predetermined policy, a server having the lowest processing load or a server having a higher response speed, for example, and performs task assignment. The load balancer 140 does not use a server that has failed unexpectedly or a server that needs maintenance, so the user can always access a server without service interruption.

DISCLOSURE OF THE INVENTION

Since a sensor node is not able to operate when the battery has run out, it is necessary to monitor the run-out state of the battery and replace the battery or the sensor node itself. In order to extend the applicable scope of sensor nodes in the future, reliable sensor network is required. The reliable sensor network should cover a disadvantage of service interruption caused at the time of battery exhaustion or of failure in order to enhance its reliability.

In applications such as disaster monitoring and environmental monitoring performed by multiple sensor nodes located in many places in nature, sensor network is required to perform high-precision monitoring with full operation of the sensors when disaster risk is high or when sensing data shows large changes. However, at a low risk of disaster, the sensor network is required to reduce power in operation to extend the lifetime by lowering information precision, reducing the number of operating sensors, and reducing the sensing frequency. When a large change is not found in an observation object regarding sensing areas, a small number of observation points per unit area is enough. However, when a large change is found in an observation object regarding areas, it is required that observation be performed at more observation points. In other words, observation granularity (space and time) of sensor network should be modified flexibly in a desired manner by a user or the sensing state.

Since the sensor node described in Background Art has the simplified configuration, the sensor node does not have a countermeasure against service interruption caused by battery replacement or sensor failure. Further, the clustering method described in Background Art aims at extending the lifetime of the network, but is not directed to a countermeasure to service interruption and to a desired modification of observation granularity. Although the load balancer described in Background Art allows server assignment so that the user does not need to take service interruption into account, it is assumed that the load balancer has a sufficient processing resource and a sufficient battery resource, unlike the compact wireless node in the sensor network. Thus, the function of the conventional load balancer is not sufficient for sensor nodes that are expected to perform an intermittent operation.

Therefore, an object of this invention is to realize a reliable sensor network which prevents service interruption. Another object is to provide a flexible management method in which observation granularity (space and time) can be modified in a desired manner by a user. Still another object is to provide a management method in which the lifetime of a sensor network is extended as long as possible by electric-power management of limited power-sensor nodes.

Specifically, an object of this invention is to provide a sensor node management method in which, even when some sensor nodes among multiple sensor nodes in intermittent operation fail, a user does not suffers service interruption. Another object is to provide a sensor node management method in which spatial and temporal observation granularities can be modified and the power saving in a sensor network can be realized, by manually or automatically changing the activation interval of each of multiple sensor nodes located in a sensing area based on user settings or interpretation of sensing data content.

According to this invention, a base station which accommodates multiple intermittent-operation sensor nodes includes a sensor management table used for managing the sensor nodes, a group management table used for grouping the multiple sensor nodes, and an operation timing control unit. The operation timing control unit determines the operation interval of each of the grouped sensor nodes and the phase relationships among the activations of the respective sensor nodes. The base station and the sensor nodes have a synchronized counter value used as a reference for the operation intervals and phases, by the sensor nodes.

When the number of working sensor nodes in a group is changed due to sensor node failure or the addition of a new sensor node, the operation timing control unit rearranges the operation interval of each of the grouped sensor nodes and the phase relationships among the activations of the respective sensor nodes, and notifies the operation interval and the phase relationships to each of the sensor nodes.

When a modification of spatial observation granularity is requested, the operation timing control unit modifies the group configuration according to the spatial granularity and the operation interval of each of the grouped sensor nodes and the phase relationships among the activations of the respective sensor nodes, and notifies the group configuration, the operation interval, and the phase relationships to each of the sensor nodes.

As described above, since the nodes are grouped and managed, it is possible to provide a sensor node management method in which, even when some sensor nodes among multiple sensor nodes in intermittent operation have failed, a user does not suffers service interruption.

Further, the activation interval of each of multiple sensor nodes located in a sensing area is manually or automatically modified by changing observation intervals and the size of each group when the nodes are grouped, so it is possible to provide a sensor node management method in which spatial and temporal observation granularities can be modified.

BRIEF DESCRIPTION OF THE DRAWINGS

FIG. 10 is a block diagram showing a configuration of the sensor node management unit of the sensor network management system according to this invention.

FIG. 11 is a block diagram showing a configuration of the sensor node management unit of the sensor network management system according to this invention.

FIG. 13 is a block diagram showing a configuration of the sensor node management unit of the sensor network management system according to this invention.

FIG. 14 is a block diagram showing a configuration of the sensor node management unit of the sensor network management system according to this invention.

BEST MODE FOR CARRYING OUT THE INVENTION

A description is given of a sensor network management system according to an embodiment of this invention.

Figure 5:
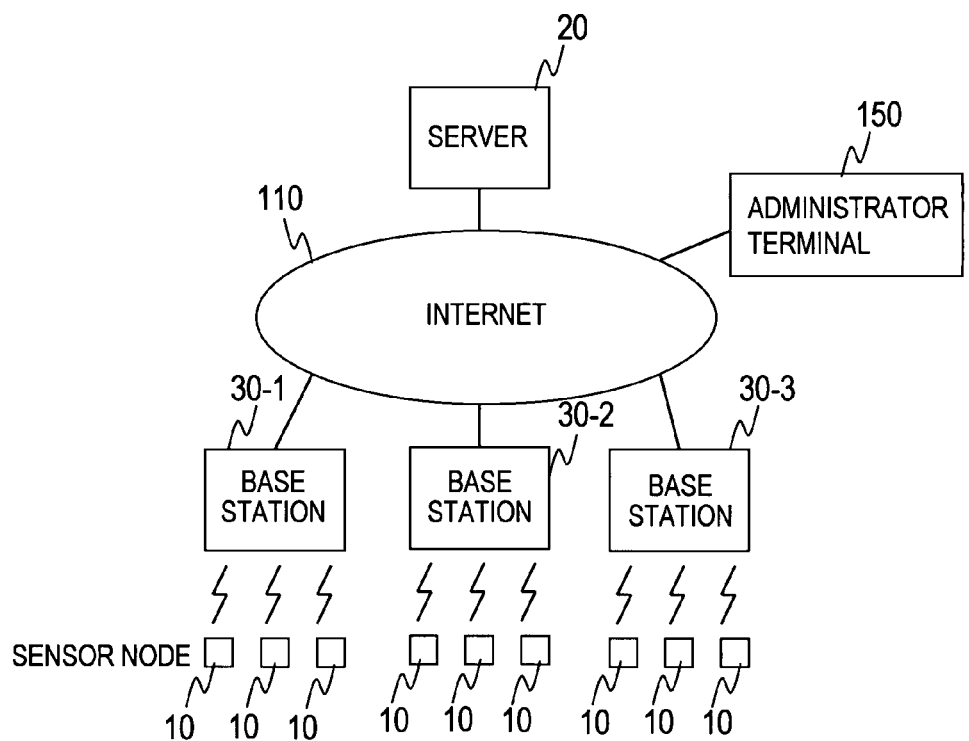
FIG. 5 is an entire configuration diagram of the sensor network management system according to this invention.

FIG. 5 shows an entire configuration of a sensor network system to which the sensor network management system of this invention is applied. Sensing information collected through a sensor network which includes multiple compact radio sensor nodes 10 are accumulated in base stations 30. The accumulated information is inputted to a server 20 via an existing network 110, for example, via a public network such as the Internet, or a private network. The server performs activation of an action corresponding to a change in sensing data, sensing data processing, sensing data accumulation processing, and the like. The function of the server 20 can be partially performed in the base stations 30 as well. An administrator can make settings for the server 20, the base stations 30, and the sensor nodes 10 and monitor them, via the network by using an administrator terminal 150.

Figure 6:
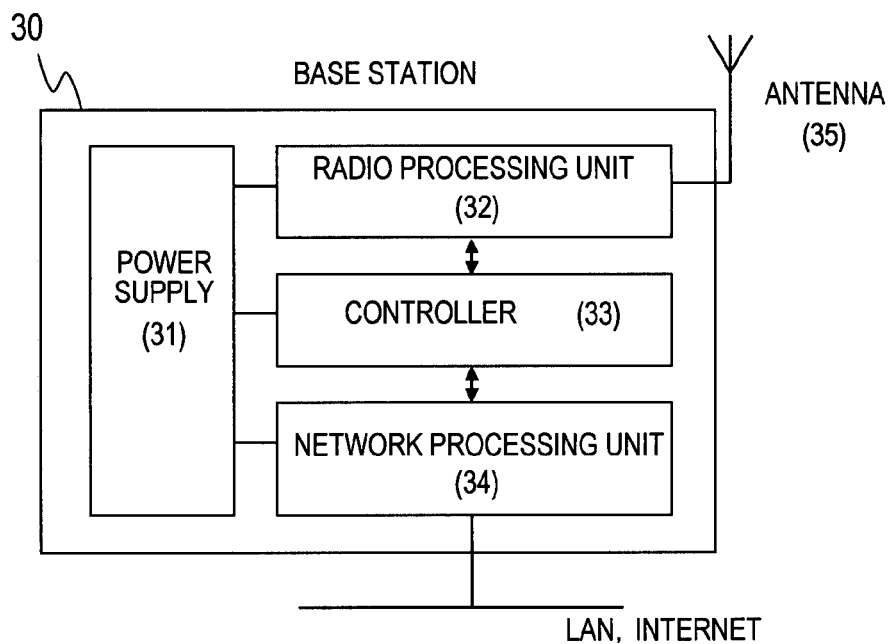
FIG. 6 is a block diagram showing a configuration of a base station of the sensor network management system according to this invention.

FIG. 6 is a block diagram of each of the base stations 30. The base station 30 includes a power supply 31, a radio processing unit 32, a controller 33, a network processing unit 34, and an antenna 35. As the power supply 31, it is conceivable to use an external power supply or a built-in power supply such as a battery. The radio processing unit 32 performs communication processing with the sensor nodes 10 via the antenna 35. The controller 33 manages the base station 30 and the sensor nodes 10, makes settings for the sensor nodes 10, and applies signal processing and the like to sensing data sent from the sensor nodes 10. The network processing unit 34 converts a data format and applies protocol processing, in order to send the sensing data to the existing network.

Figure 2:
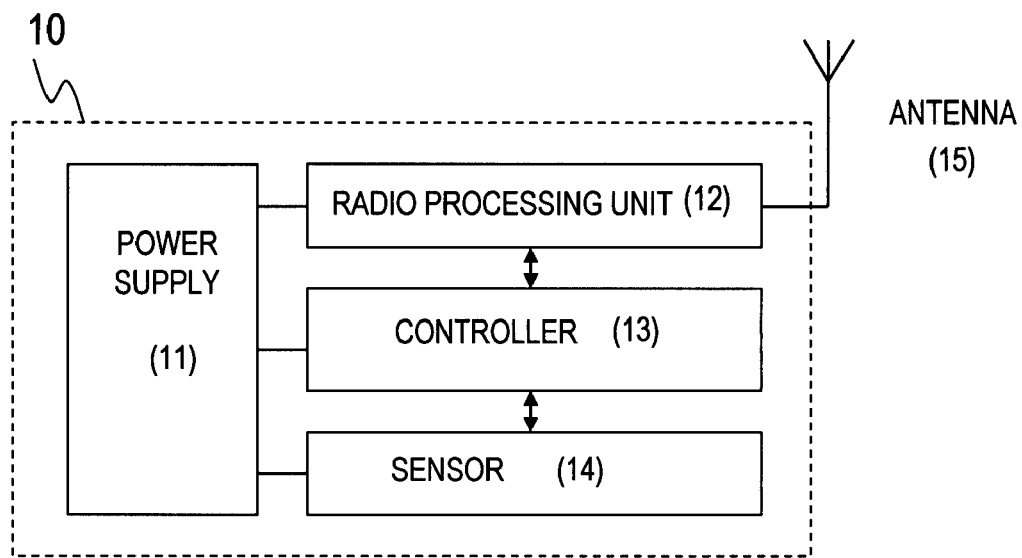
FIG. 2 is a block diagram showing a configuration of a conventional sensor node.
Figure 3:
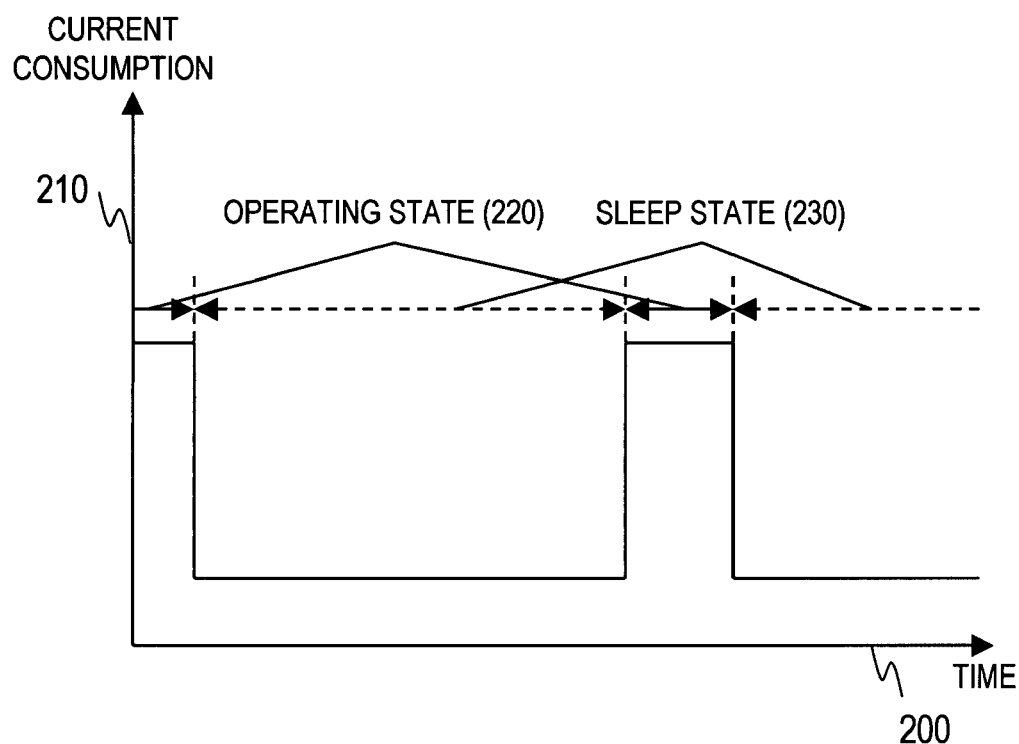
FIG. 3 is a timing chart showing an operation of the conventional sensor node.
Figure 4:
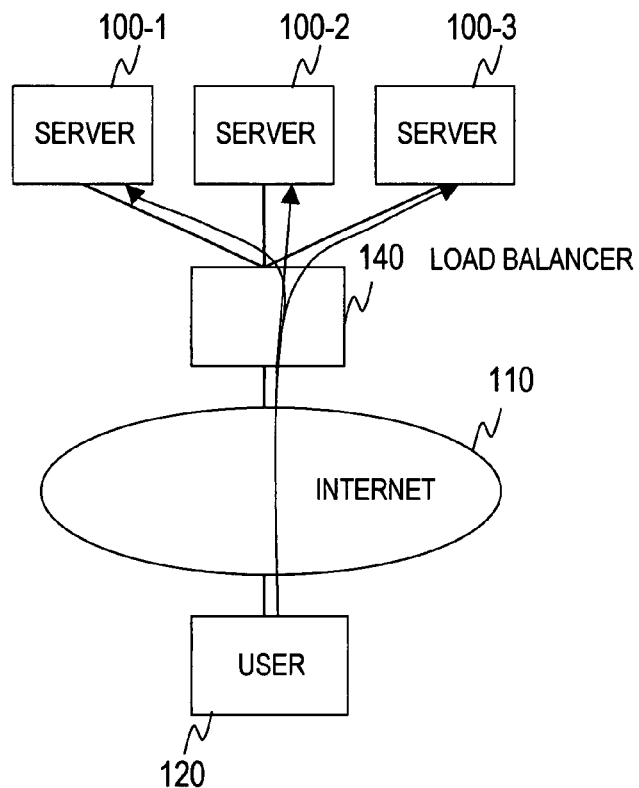
FIG. 4 is a block diagram showing a configuration example of a conventional load balance system.
Figure 7:
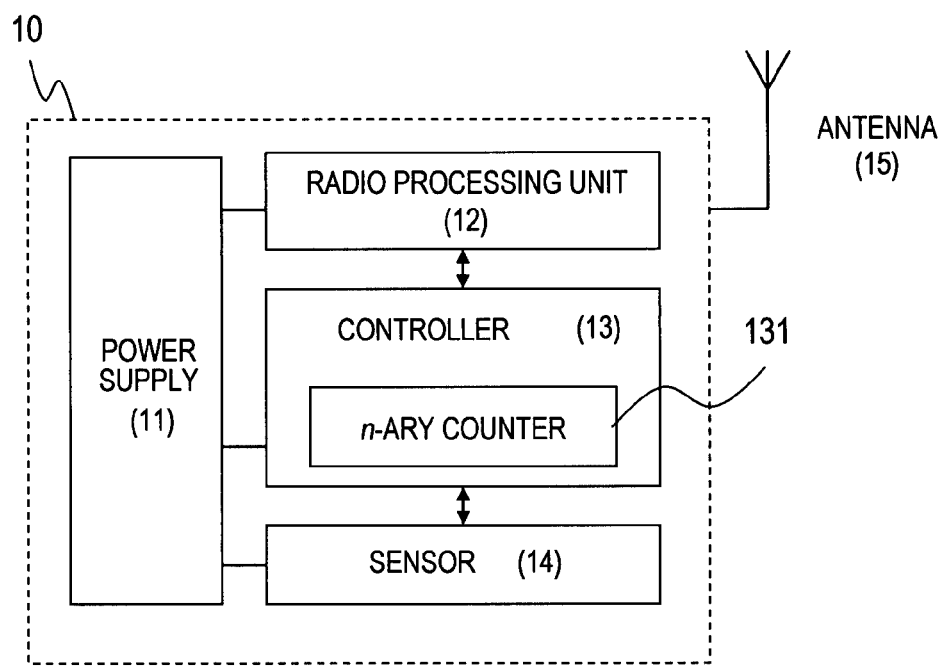
FIG. 7 is a block diagram showing a configuration of a sensor node of the sensor network management system according to this invention.

As shown in FIG. 7, each of the sensor nodes 10 used in the sensor network management system according to this invention has an n-ary counter 131 in the controller 13, in addition to the components included in the conventional sensor node (FIG. 2). The operation cycle and start timing of an intermittent operation are determined based on the value of the n-ary counter 131. An observation interval and observation start timing, to be described later, which are reported by the base station 30 are stored in a memory provided in the controller 13.

Figure 1:
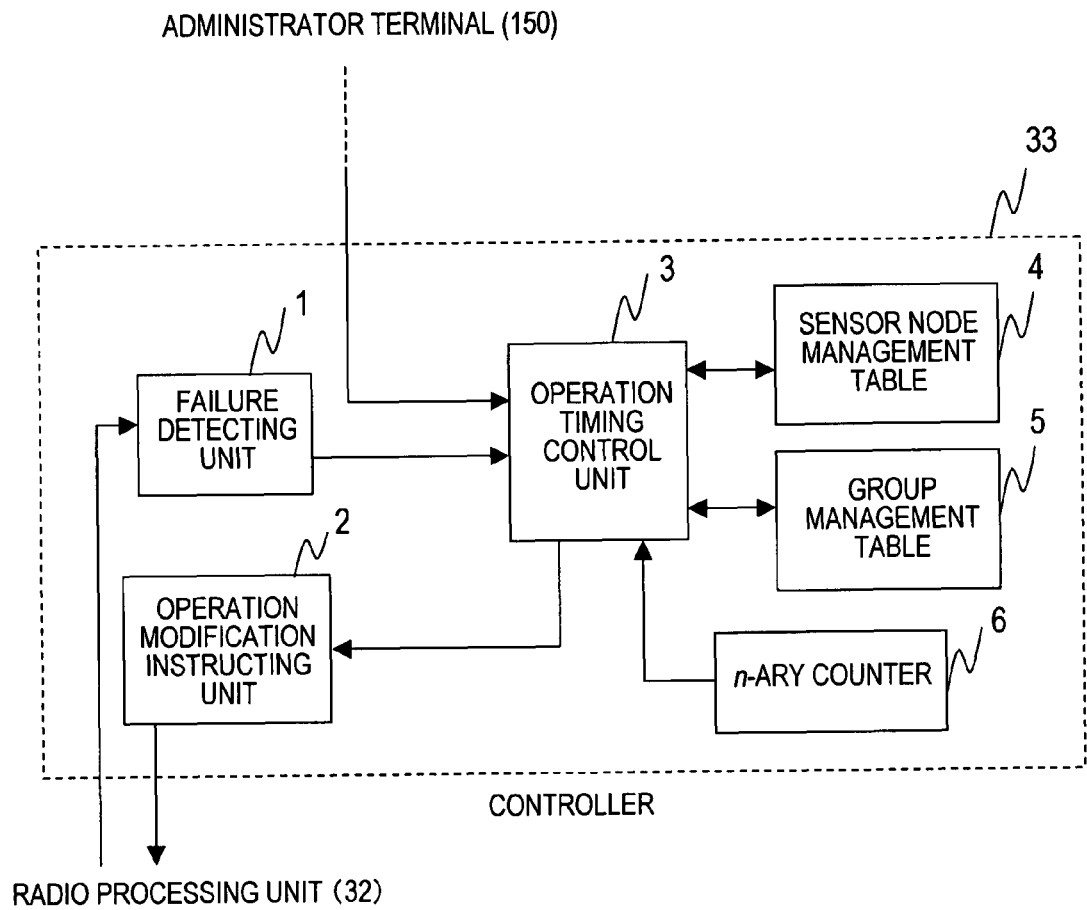
FIG. 1 is a block diagram showing a configuration of a sensor node management unit of a sensor network management system according to this invention.

FIG. 1 shows a configuration of the controller 33 of the base station 30. The controller 33 includes a failure detecting unit 1, an operation modification instructing unit 2, an operation timing control unit 3, a sensor node management table 4, a group management table 5 (those tables are stored in the memory), and an n-ary counter 6 identical to that of the sensor node 10. In the sensor node management table 4, a node identifier (node ID) 510 of each of the sensor nodes 10, controlled by the base station 10, is registered.

Figure 8:
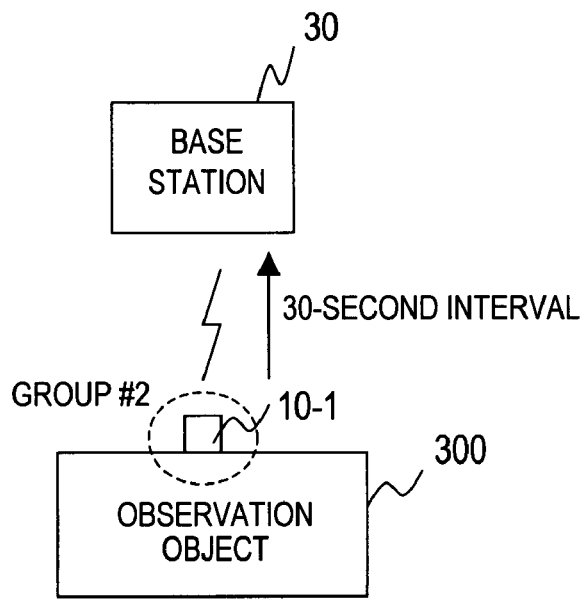
FIG. 8 is a block diagram showing an operation example of the sensor network management system according to this invention.
Figure 9:
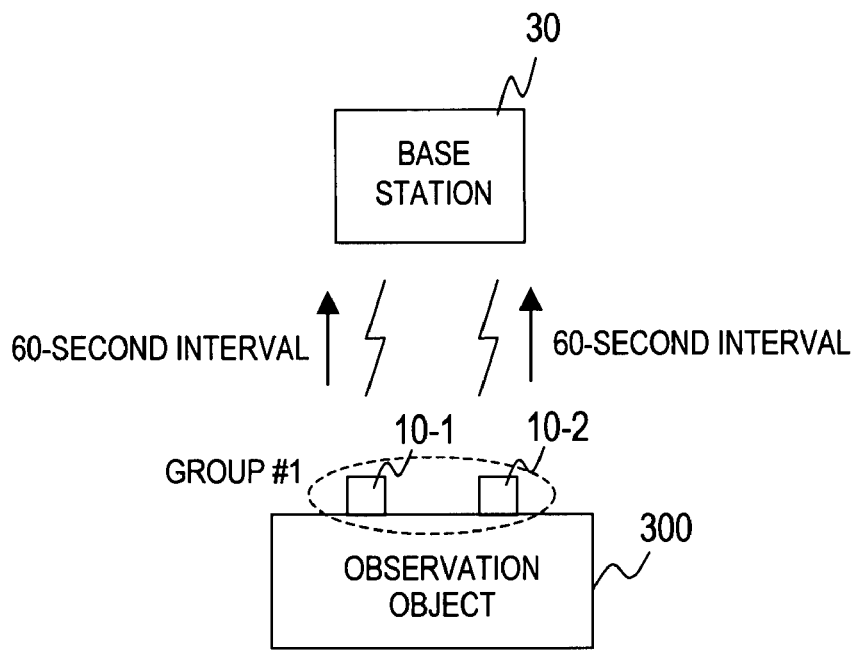
FIG. 9 is a block diagram showing an operation example of the sensor network management system according to this invention.

Next, sensor node redundant management performed by the controller 33 of the base station will be described. A description is given of an example case where redundant management is performed by adding a sensor node 10-2, as shown in FIG. 9, to a system in which a single sensor node 10-1 performs an operation of sensing the temperature and pressure of an observation object 300 and sends sensing information to the base station 30, as shown in FIG. 8. The observation object 300 is an industrial product, a building, a natural phenomenon, or the like.

First, the controller 33 of the base station 30 performs grouping processing with respect to the sensor nodes 10 arranged on the observation object. When redundant management is required, a group is formed by multiple sensor nodes. When redundant management is not required, however, a group may be formed by a single sensor node.

Specifically, as shown in FIG. 11, in the group management table 6, a new group ID (610) is assigned, the node ID or node IDs (620) of one or more sensor nodes included in the group are registered, and an observation interval (630) required for the entire group is registered. The number of nodes (640) included in the group is automatically calculated based on the number of registered node IDs (620). When the ID of the sensor node 10-1 is #1 and the ID of the sensor node 10-2 is #2, the two sensor nodes 10-1 and 10-2 are registered in a group #1, and another sensor node #3 is registered in a group #2, in the example of FIG. 11. The observation interval (630) is set to 30 seconds in both of the groups. After the group management table 6 is generated, information thereof is used to calculate an observation interval (530) and a start slot (540) corresponding to each sensor node (510), of a sensor node management table 5 shown in FIG. 10. For example, the group #1 includes the two sensor nodes. Thus, the two sensor nodes just need to be alternately operated in order to realize the required observation interval of 30 seconds. Specifically, each of the two sensor nodes 10-1 and 10-2, which comprises the group #1, needs to be operated at intervals of 60 seconds. Counter values for specifying operation start timing are inputted in the start slot (540) such that the two sensor nodes alternately start operations with start timing shifted by 30 seconds. When the n-ary counter 131, which counts one for one second, for example, is used, a value of "0" is inputted in the start slot (540) corresponding to the node ID #1, and a value of "30" is inputted in the start slot (540) corresponding to the node ID #2. The start slot priority of the multiple sensor nodes 10 may be determined in an ascending order of the ID numbers of the sensor nodes 10, for example.

Next, a setting procedure performed when the base station 30 groups the subordinate sensor nodes 10 will be described. First, the base station 30 sends a counter-value reset request command to the subordinate sensor nodes 10-1 and 10-2. The reset request command is generated by the operation timing control unit 3. Specifically, the counter value of the n-ary counter 6 of the base station 30 is read at the time of command issuance, and the reset request command is simultaneously or sequentially sent to the subordinate sensor nodes 10. The sensor nodes 10-1 and 10-2 receive the reset request command, and simultaneously set the counter values of the n-ary counters 131 to the received counter value so as to synchronize the n-ary counters 131 of all the sensor nodes 10 included in the group with the n-ary counter 6 of the base station 30. To maintain the synchronized state, the reset request command is periodically sent by the base station 30 to the sensor nodes 10.

Next, the operation modification instructing unit 2 of the base station 30 sends an operation interval command and an operation start timing command to each of the sensor nodes 10 included in the group. The operation interval command and the operation start timing command are generated with reference to the sensor management table 5. Specifically, for the group without redundancy (FIG. 8), a command in which the operation interval is set to 30 and the operation start timing is set to 0 is issued to the sensor node 10 (in the case of node ID #3 of the sensor management table 5). For the group with redundancy (FIG. 9), a command in which the operation interval is set to 60 and the operation start timing is set to 0 is issued to the sensor node 10-1 (in the case of node ID #1 of the sensor management table 5), and a command in which the operation interval is set to 60 and the operation start timing is set to 30 is issued to the sensor node 10-2 (in the case of node ID #2 of the sensor management table 5). After the sensor node 10 receives a command in which the operation interval is set to "x" and the operation start timing is set to "y", the sensor node 10 is activated from a sleep mode to perform sensing and send data only when n-ary counter has the value obtained by adding "a multiple of x" to "y". Otherwise, the sensor node 10 is in the sleep mode to suppress power consumption as much as possible.

Figure 12:
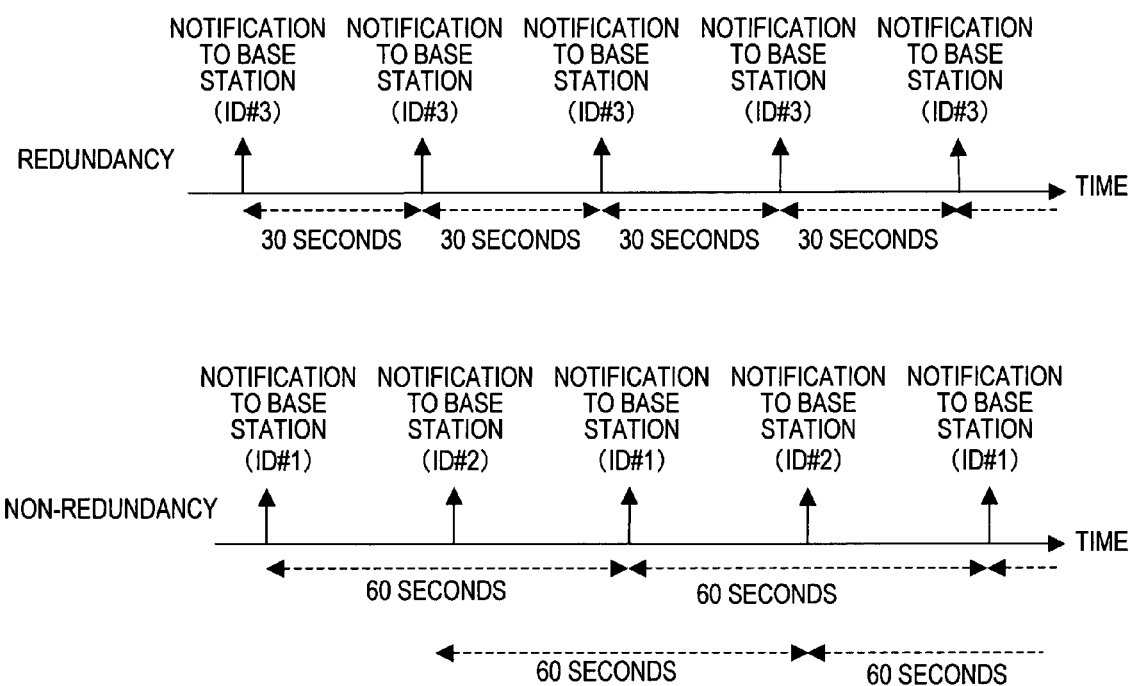
FIG. 12 is a timing chart showing an operation example of the sensor node of the sensor network management system according to this invention.

Accordingly, redundancy can be realized by alternately operating the two sensor nodes at intervals of one minute, as shown in FIG. 9. FIG. 12 shows the timing of each intermittent operation performed in the non-redundant case (FIG. 8) and in the redundant case (FIG. 9). In the non-redundant case, the sensor node of ID#3 sends data to the base station 30 at intervals of 30 seconds. In the redundant case, each of the sensor nodes of ID#1 and ID#2 sends data to the base station 30 at intervals of 60 seconds. Since the base station treats sensing data received from either of the sensor nodes of ID#1 and ID#2 as sensing data of the group #1, it is possible to provide the sensing data to the user of the sensor nodes as if the sensing data were an observation result obtained by a single sensor.

Figure 22:
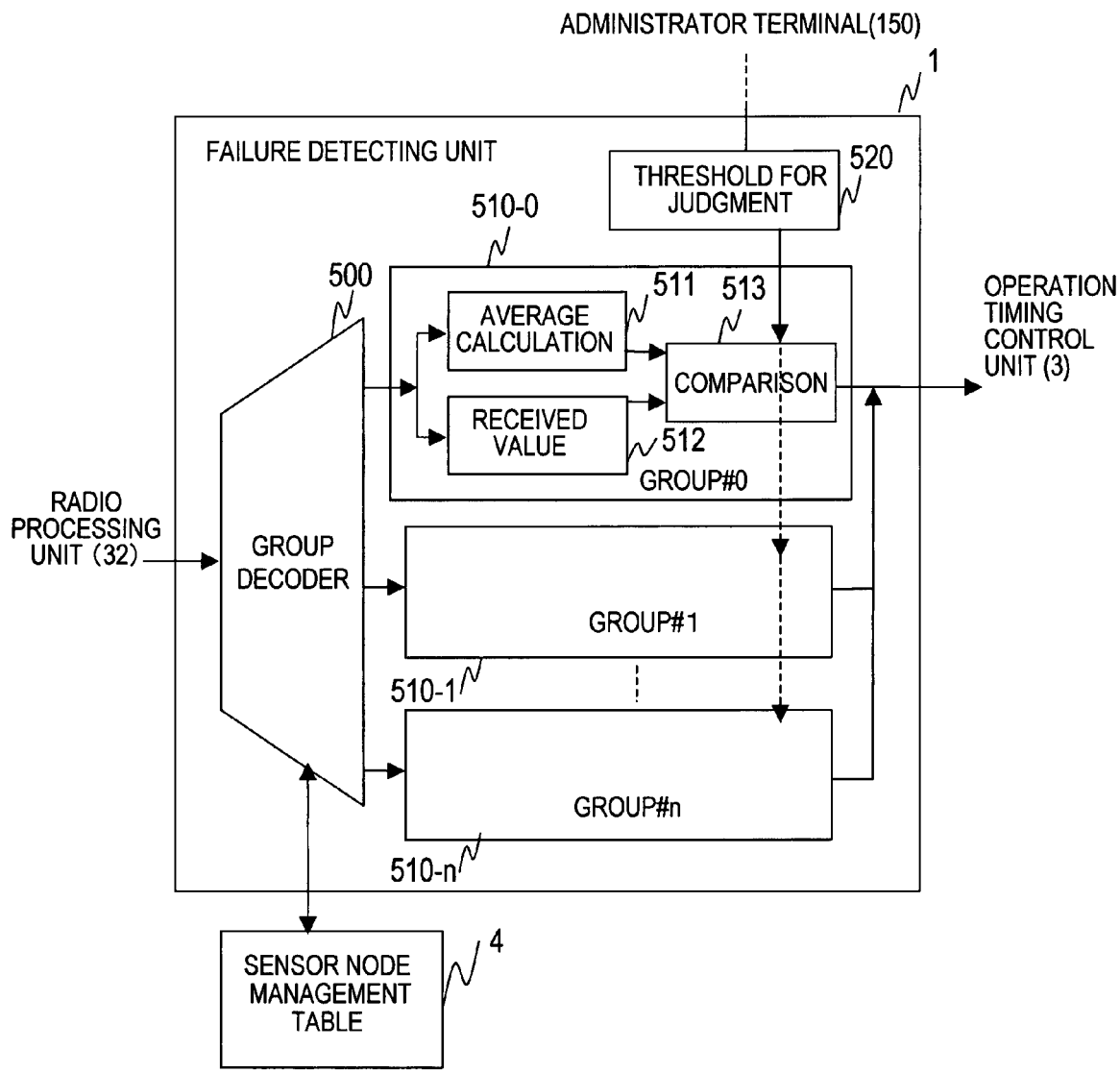
FIG. 22 is a block diagram showing a configuration of the sensor node management unit of the sensor network management system according to this invention.

Next, we explain the case where failure occurs in one of the sensor nodes 10-1 and 10-2 of the group #1 having sensor-node redundancy. The failure detecting unit 1 of the base station 30 monitors sensor data which is periodically received from the sensor nodes 10, and, when reception from any of the sensor nodes is stopped or when unexpected data is detected, determines that sensor-node failure has occurred. Specifically, the failure detecting unit 1 can always calculate the average of observation values of data sent from the sensor nodes 10 in units of groups, as shown in FIG. 22, to determine that a failure has occurred in a sensor node 10 that has sent data away from the average of observation values by a predetermined value.

Upon detection of failure of the sensor node 10-1, the failure detecting unit 1 notifies the node ID#1 of the sensor node 10-1 to the operation timing control unit 3. The operation timing control unit 3 changes the status corresponding to the node ID#1, which indicates the sensor node 10-1, to a stopped state, in the sensor node management table 5-1 (FIG. 13), and deletes, from the group management table 6, the sensor node 10-1 (ID#1) registered in the group #1. Based on the specified observation interval 630 and the remaining number of nodes 640 of the group management table 6-1, the observation interval 530 and the start slot 540 of the sensor node 10 of the group are recalculated (FIG. 14). Specifically, the group #1 has only the sensor node 10-2 left, so the operation timing control unit sets "30" in the observation interval 530 and "0" in the start slot 540. A command in which the operation interval is set to 30 and the operation start timing is set to 0 is issued to the sensor node 10-2 (in the case of the node ID#2 of the sensor management table 5-1), and then the sensor node 10-2 starts an operation at timing newly specified. The sensor node starts an intermittent operation at the same timing as in the non-redundant case of FIG. 8. As described above, since sensing data is always sent to the base station 30 at the interval specified in the observation interval 630 of the group management table 6, it is possible to provide sensing information to the user at regular intervals without service interruption. In the same way, even when a new sensor node is added (FIG. 9) to the non-redundant case (FIG. 8), the operation timing control unit 3 of the base station 30 calculates the observation interval and the start slot of each sensor node in each group based on the observation interval 630 and the number of nodes 640 of the entire group, and then issues an operation modification instruction to the sensor nodes 10 of the group. Not only at failure of the sensor node 10 but also at battery replacement, sensor node maintenance, or sensor node replacement, a change in the sensor node 10 to be stopped can be instructed to the operation timing control unit 3 from the administrator terminal 150.

Since the intermittent operation is modified as described above, the user does not suffer service interruption even when the battery is replaced or when failure occurs in one of the sensors. In the above example, the description has been given mainly to the case where two sensor nodes 10 are included in a group. However, the same management can be applied even when three or more sensor nodes are included in a group. Further, when the sensor nodes 10 each have different remaining power and power consumption, the percentage of transmission frequency assigned to each of the sensor nodes 10 in a group can also be modified according to the remaining power and the power consumption.

Figure 15:
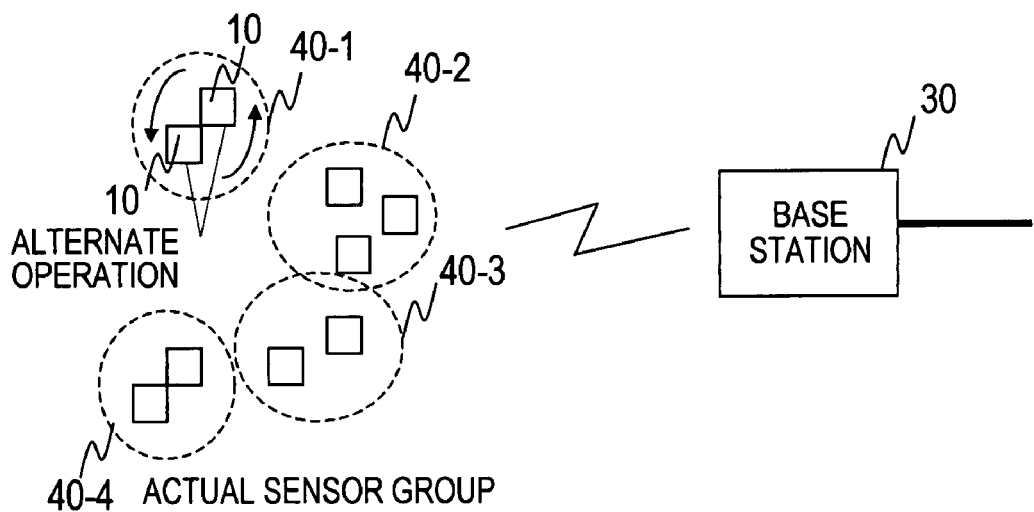
FIG. 15 shows an operation example of the sensor network management system according to this invention.
Figure 16:
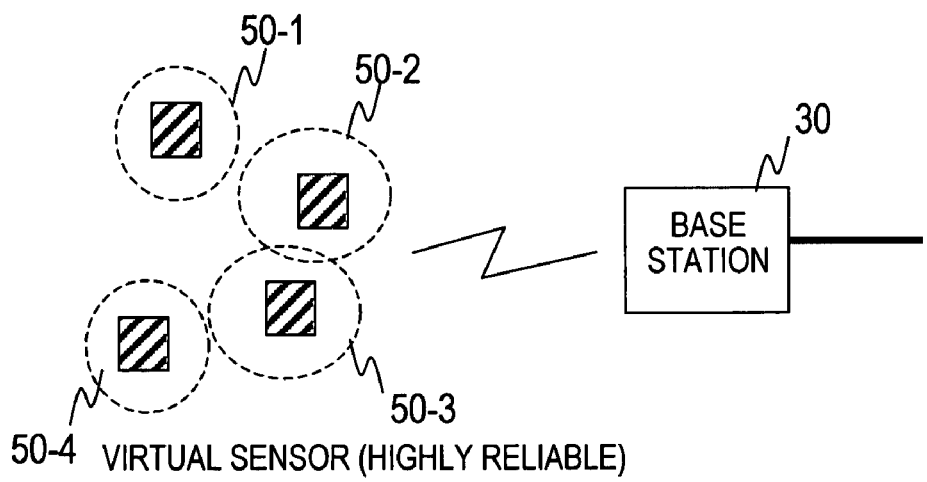
FIG. 16 shows an operation example of the sensor network management system according to this invention.

As shown in FIG. 15, when the multiple redundant sensor nodes 10 are managed in units of groups 40, a virtual management can be performed so that the user handles the respective groups as if the respective groups were highly reliable sensors 50 (with no failure and no battery exhaustion), as shown in FIG. 16.

Figure 23:
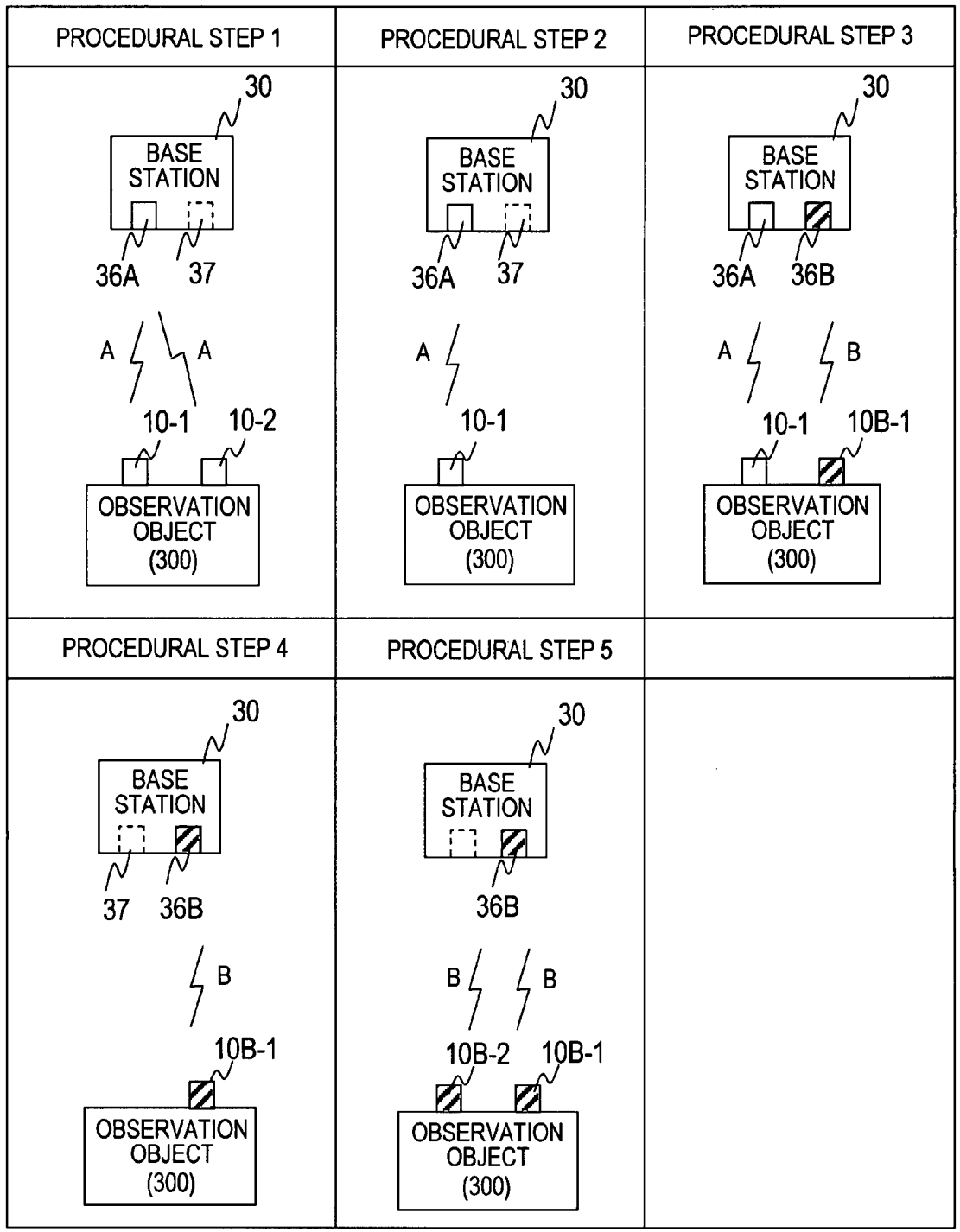
FIG. 23 is an explanatory diagram of a sensor node replacing procedure using the sensor network management system according to this invention.

Next, referring to FIG. 23, a description is given to a case where a radio system used by the base station 30 and the sensor node 10 is changed. In a sensor network system in which the observation object 300 is observed using a radio system A, the base station 30 performs communication with the sensor nodes 10-1 and 10-2 by using a transmission and reception circuit 36A corresponding to the radio system A. The base station 30 has a vacant slot 37 to which a transmission and reception circuit corresponding to another radio system can be installed. A description is given to a procedure in which the radio system A used by the base station 30 and the sensor node 10 is changed to a radio system B. Process 1 shows a state in which the multiple sensor nodes 10-1 and 10-2, which are grouped and managed, observe the observation object 300 and send sensing data to the base station 30. The radio system A is used between the sensor nodes 10 and the base station 30. In Process 2, one of the multiple redundant sensor nodes 10, i.e., the sensor node 10-2, is removed. The operation timing control unit 3 modifies the intermittent operation of the sensor node 10-1, so the user does not suffer service interruption. In Process 3, a transmission and reception circuit 36B corresponding to the new radio system B is installed in the base station 30, and further, a sensor node 10B-1 corresponding to the radio system B is installed to the observation object 300. The operation timing control unit 3 puts the sensor node 10-1 and the newly-installed sensor node 10B-1 together into a group, and modifies the intermittent operation. In Process 4, the sensor node 10-1 and the transmission and reception circuit 36A, corresponding to the radio system A, are removed. Finally, in Process 5, a sensor node 10-B1 corresponding to the radio system B is installed. Through Processes 1 to 5, the radio system can be upgraded while a constant transmission interval is maintained and while the user does not suffer service interruption.

Figure 24:
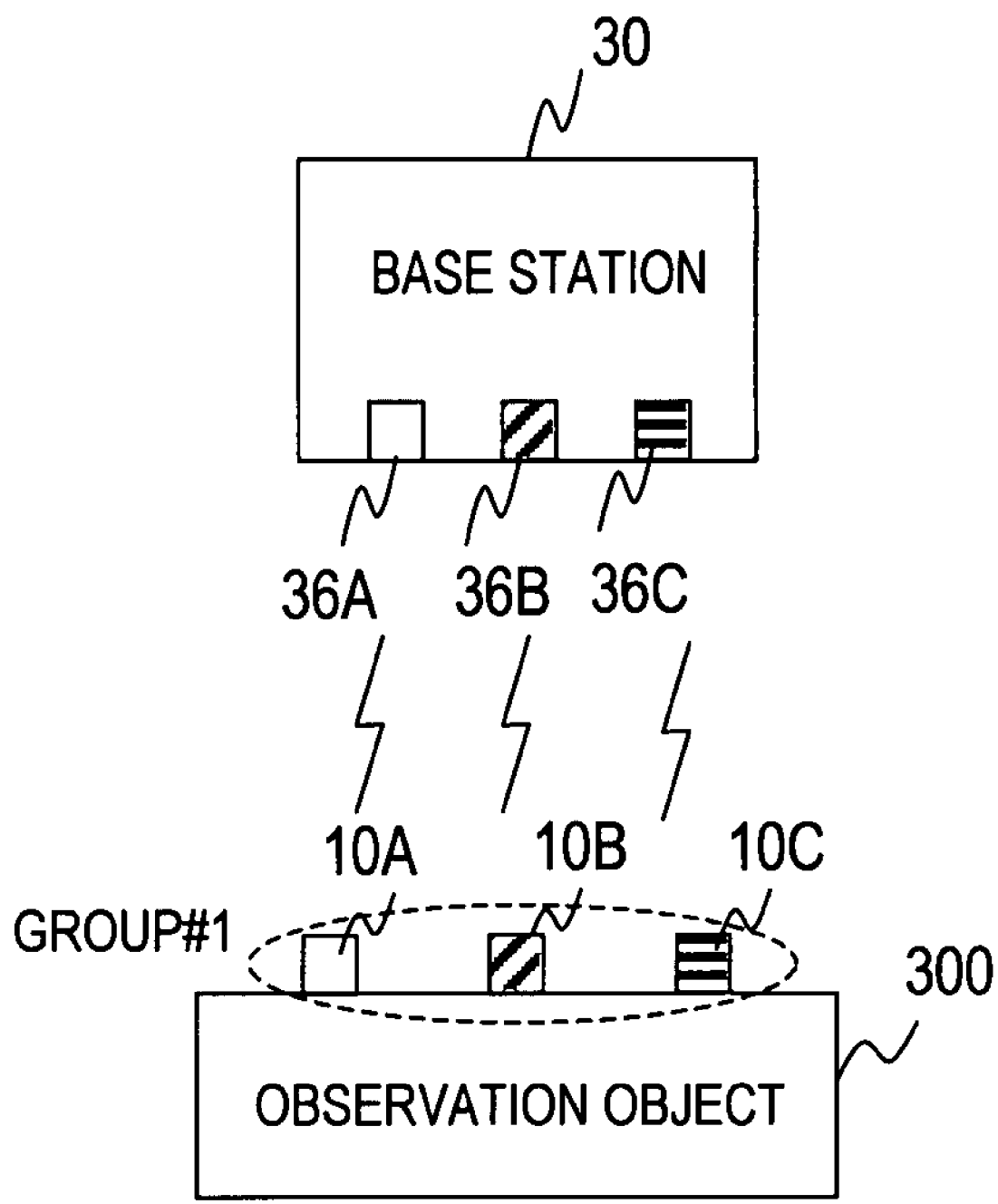
FIG. 24 is a configuration diagram showing a case where sensor nodes performing communication by multiple radio systems are assigned to a single observation object.

FIG. 24 shows a case where the sensor nodes 10 (10A, 10B, and 10C) using different radio systems are installed to the same observation object 300, and data sent from the sensor nodes 10 is received by circuits (36A, 36B, and 36C) corresponding to the radio systems of the sensor nodes 10, respectively, in the base station 30. The sensor nodes 10 (10A, 10B, and 10C) are managed as in an identical group by the operation timing control unit 3, so a highly reliable sensor network system can be realized in which, even when the radio environment is changed and a part of the radio systems is not available, the service is maintained and data can be received in the base station 30 at a constant interval.

The example in which the controller 33 is provided in the base station has been described above. However, the same advantage can be obtained even when the administrator terminal has the functions of the controller 33, particularly, the function of setting and storing the sensor node management table and the group management table.

Next, a sensor network management system in which observation granularity can be modified while realizing redundancy in the sensor network, according to another embodiment will be described. In an example shown in FIG. 17, a number of the sensor nodes 10 are arranged in an area 301 of 80 m by 80 m, and the base station 30 is positioned at almost the center thereof. All of the sensor nodes 10 can access the base station 30 by radio. The sensor nodes 10 are arranged in an orderly manner in FIG. 17 but may not necessarily be arranged in an orderly manner. Each of the sensor nodes performs sensing of a natural phenomenon or the like, and periodically reports a sensing result to the base station 30. There is a case where, with respect to the granularity of the sensor nodes 10 arranged in the area 301, the granularity of points at which the natural phenomenon changes is sufficiently larger or the user wishes a larger observation granularity. In this case, it is necessary to divide the area 301 into multiple sub-areas (each of which includes multiple sensor nodes) and to report the value obtained from each sub-area to the user.

Figure 17:
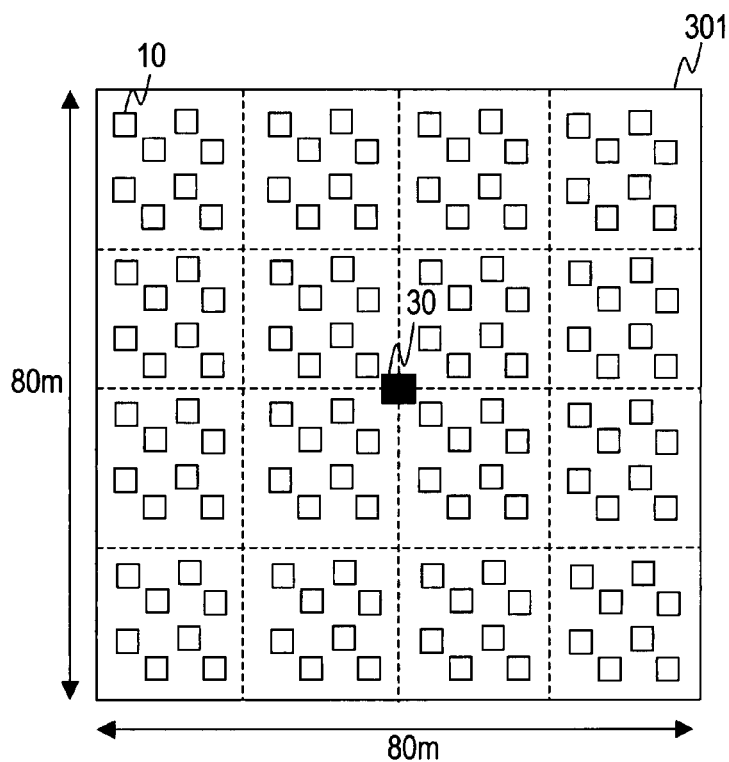
FIG. 17 is an explanatory diagram of a sensor network arrangement using the sensor network management system according to this invention.
Figure 18:
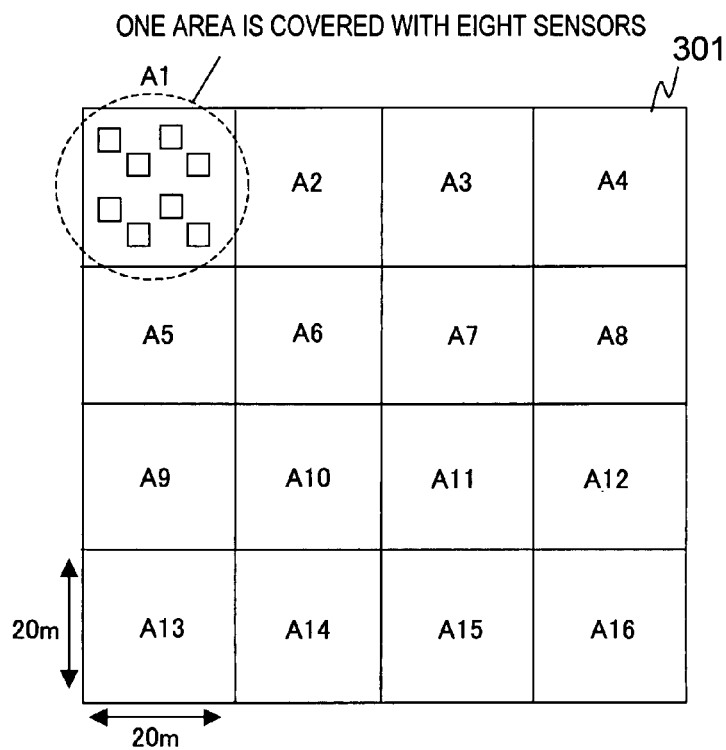
FIG. 18 is an explanatory diagram of a sensor network arrangement using the sensor network management system according to this invention.
Figure 19:
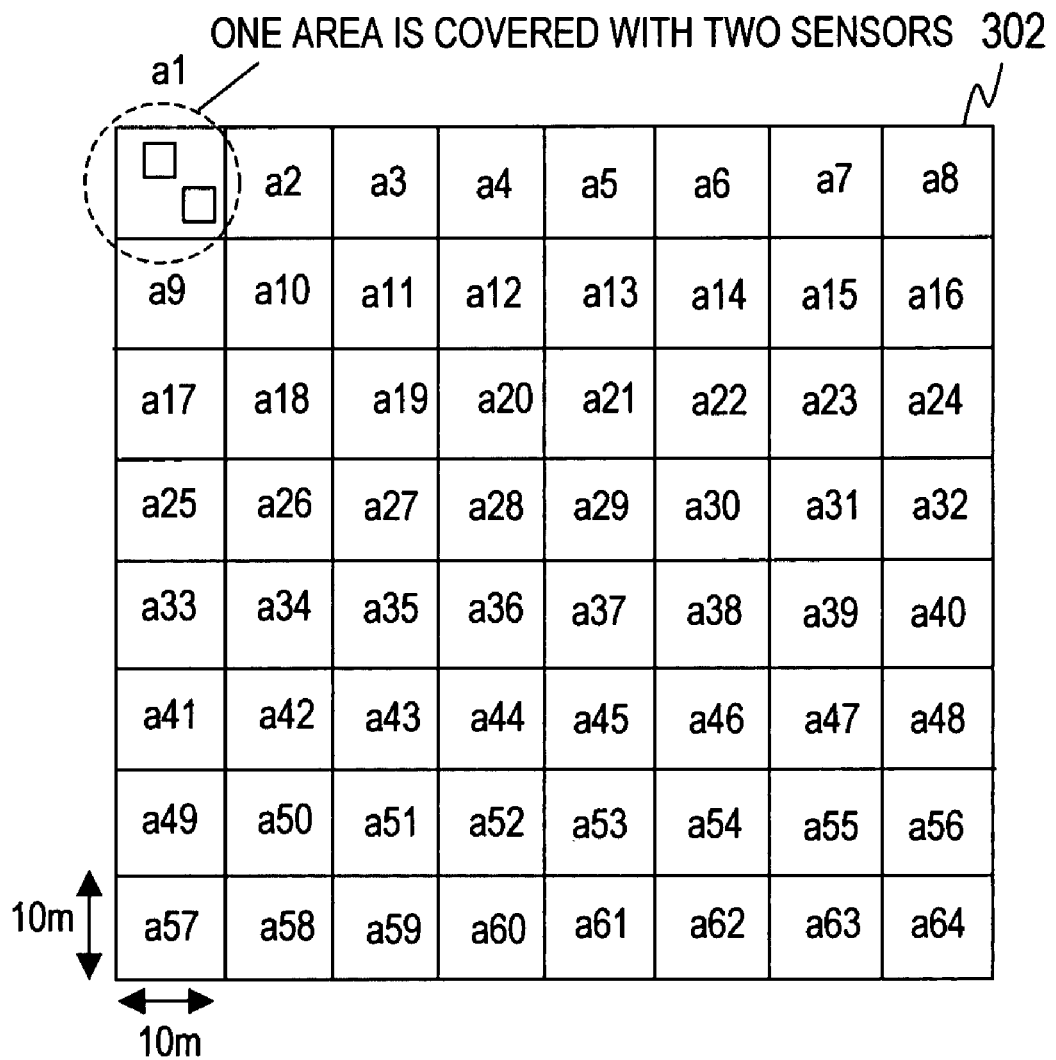
FIG. 19 is an explanatory diagram of a sensor network arrangement using the sensor network management system according to this invention.

First, a case where the user performs observation with a spatial granularity of 20 m by 20 m is discussed. In FIG. 18, the area of FIG. 17 is divided into 16 sub-areas (A1 to A16) each having the size of 20 m by 20 m. Each area is covered with eight sensor nodes 10. In each sub-area, the redundant management, in which the sensor nodes 10 are grouped to alternately perform sensing and notification of a result of the sensing as described in the previous embodiment, is applied to the multiple sensor nodes 10 of the sub-area. In the same way, when the user requests to perform observation with a spatial granularity of 10 m by 10 m, an area 302 is divided into 64 sub-areas (a1 to a64) each having the size of 10 m by 10 m as described in FIG. 19. Each sub-area is covered with two sensor nodes 10. The sensor nodes are grouped in each sub-area, and the redundant management, described in the previous embodiment, is applied to the grouped sensor nodes.

In the above examples, a request for modifying the spatial granularity has been described. A request can also be made for modifying the temporal observation granularity by changing the frequency of observation and notification in each group and in each node.

Figure 20:
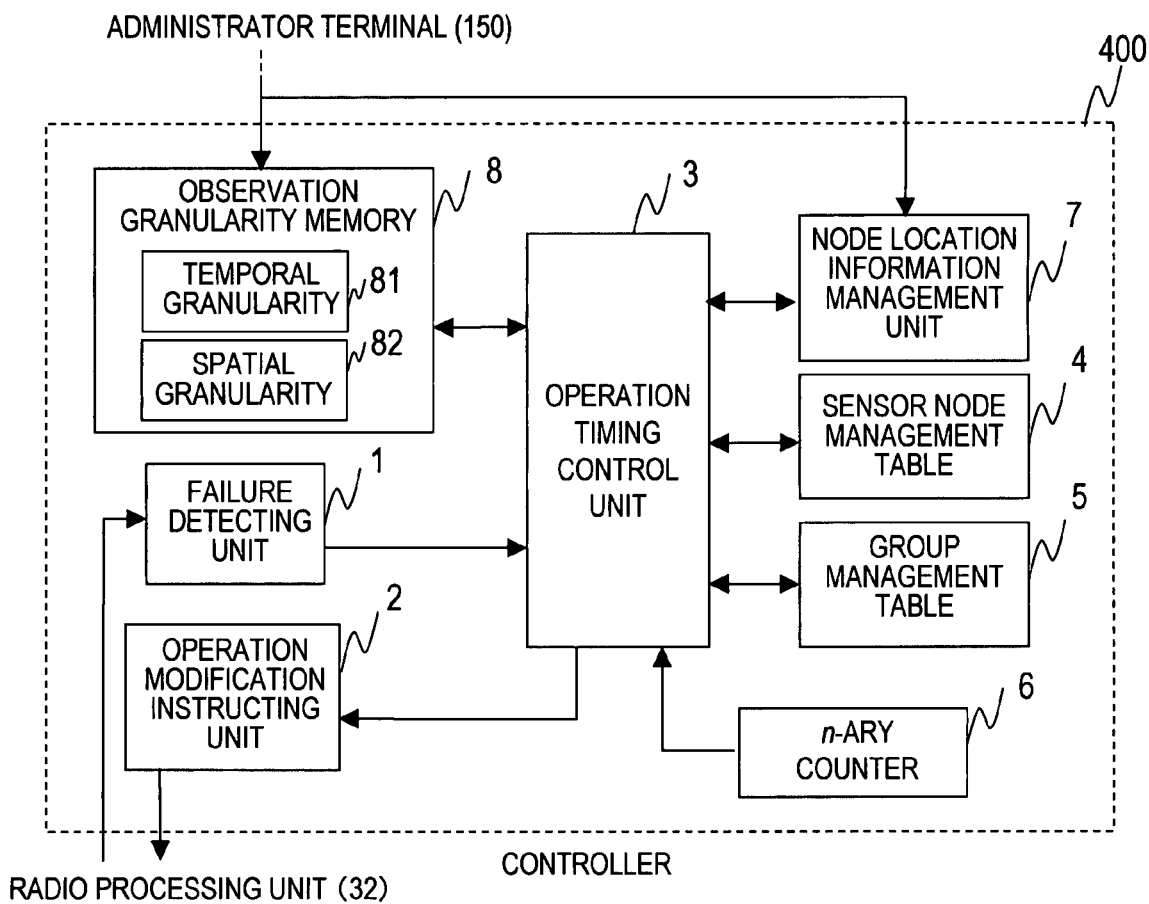
FIG. 20 is a block diagram showing a configuration of a sensor node management unit of the sensor network management system according to this invention.

FIG. 20 shows a configuration of a controller 400 which can modify the spatial and temporal granularity. In the configuration of the controller 400, components added to the controller 33, shown in FIG. 1, will be mainly described. The sensor network management unit 400 includes, in addition to the components included in the sensor network management unit 33, shown in FIG. 1, a node location information management unit 7 and an observation granularity memory 8 which includes a temporal granularity 81 and a spatial granularity 82. The location information (such as latitude-longitude coordinates and rectangular coordinates) of each of the sensor nodes 10 included in the area 302 is inputted in the node location information management unit 7 through the administrator terminal. When the sensor node 10 has a locating function such as Global Positioning System (GPS) or when the relative location of the sensor node 10 is obtained by measuring the location of the sensor node 10 based on communication with the base station 30, the location information is automatically inputted in the node location information management unit 7 at the time of installation of each sensor node 10. The observation granularity memory 8 shown in FIG. 8 holds the observation spatial granularity and the observation temporal granularity specified by the user. The temporal granularity 81 and the spatial granularity 82 are specified by the user through the administrator terminal 150.

Figure 25:
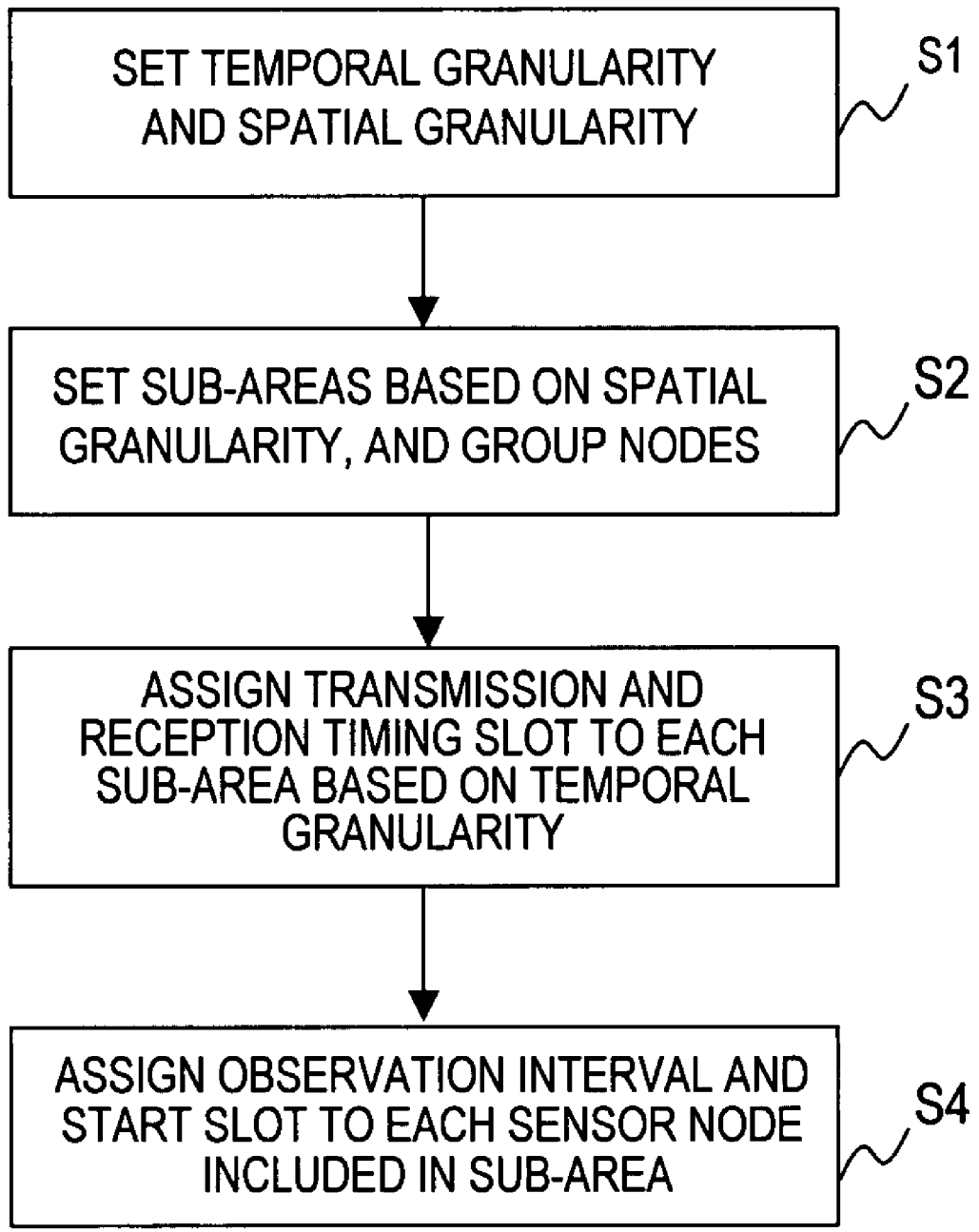
FIG. 25 is a flow diagram showing a procedure in a case where observation is performed in each sub-area.

Next, referring to FIG. 25, a description is given to a specific procedure performed when the area 301 shown in FIG. 17 is observed in units of sub-areas.

In Step 1, the user sets the temporal granularity 81 and the spatial granularity 82 in the observation granularity memory.

In Step 2, the area 301 is divided into multiple sub-areas based on information of the spatial granularity 82 and information of the node location information management unit 7. For example, when the spatial granularity 82 is set to 20 m, 16 sub-areas are generated as shown in FIG. 18. By using information of the node location information management unit 7, the sensor nodes 10 to be included in each of the sub-areas are determined and grouped, thereby setting the group management table of FIG. 11.

In Step 3, a transmission and reception timing slot is assigned for each sub-area. Since the sensor node management unit of the base station 30 has the n-ary counter 6 and the sensor node 10 has the n-ary counter 131, when there are 16 sub-areas (A1 to A16), timing slot (one count corresponds to one timing) counted by the n-ary counter is divided into 16. Then, timing slots, i.e., slots 0, 16, 32, . . . , and n-16, are assigned to a sub-area A1 and timing slots, i.e., slots 1, 17, 33, . . . , and n-15, are assigned to a sub-area A2 (the same rule applies to A3 to A16). The n-ary counter 6 and the n-ary counter 131 both have a count-up cycle "t" sufficiently smaller than an expected temporal granularity 81, and have a countable total time "n-×t" sufficiently larger than the expected temporal granularity 81. In another system, when the base station 30 and the sensor nodes 10 can be provided with the same number of frequency channels as that of sub-areas, the base station 30 needs to specify a frequency channel used for each sub-area, and does not need to assign the transmission and reception timing slot to each sub-area in this case.

In Step 4, the observation interval and the start slot are assigned to each sensor node 10 in units of sub-areas, by the redundant management method described in the previous embodiment. For example, in the sub-area A1, the assigned timing slot is used to calculate transmission timing of each of the eight sensor nodes 10-1 to 10-8, according to the requested temporal granularity 81. Based on Steps 3 and 4, the sensor node management table of FIG. 10 is set.

Through the above-described procedure, the sensor network management capable of modifying the observation granularity can be realized.

Figure 21:
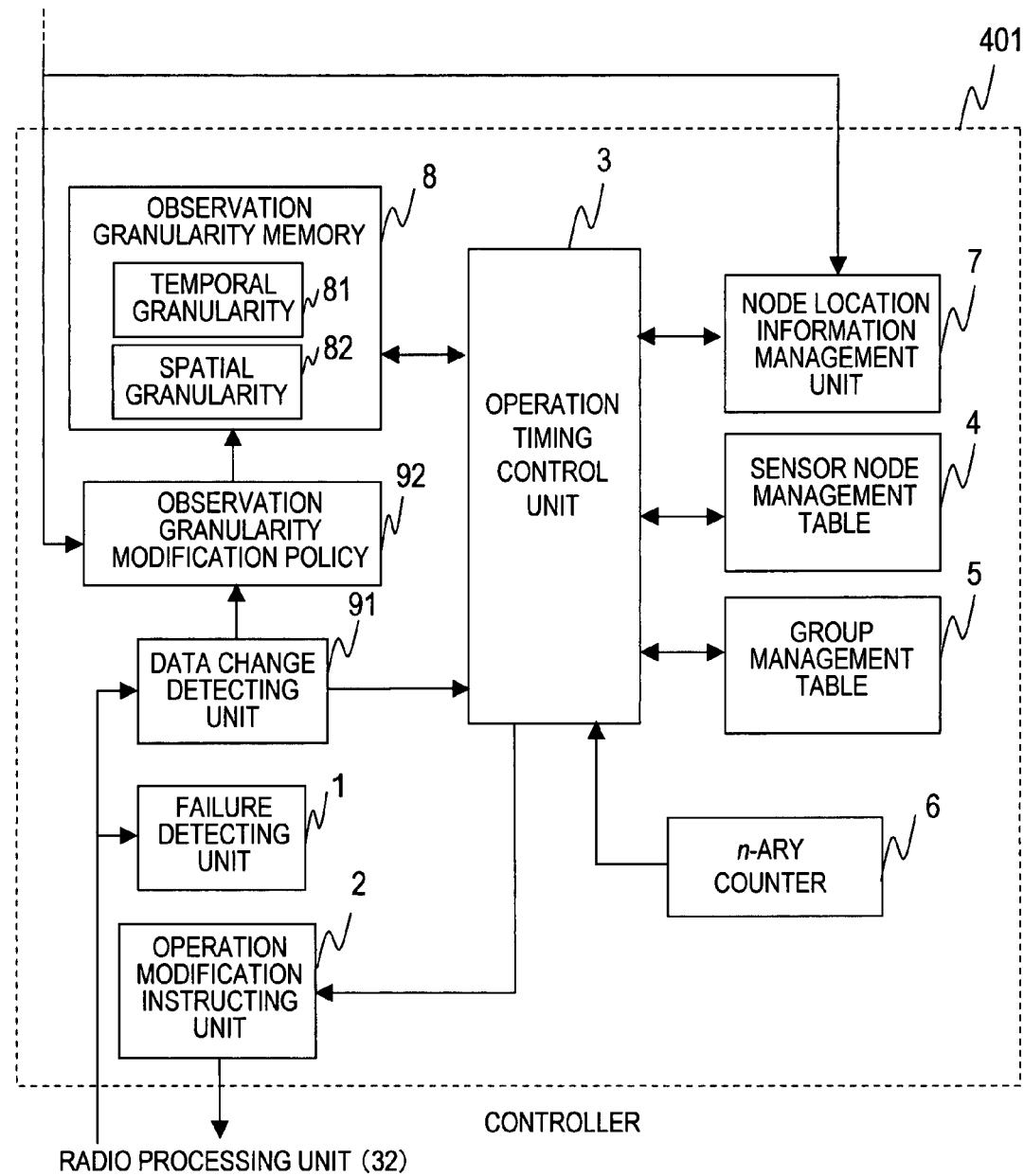
FIG. 21 is a block diagram showing a configuration of a sensor node management unit of the sensor network management system according to this invention.

Further, a change in the observation granularity can be automatically performed according to a predetermined policy. FIG. 21 shows a configuration of a controller 401 capable of automatically modifying the observation granularity. In this case, an observation granularity modification policy 92 and a data change detecting unit 91 are added to the configuration of the controller 400 shown in FIG. 20. In the observation granularity modification policy, a policy item is set in advance in which, for example, when an observation value exceeds a given value or when a variation in sensing data of the observation object depending on time or spaces exceeds a predetermined value, the observation granularity (space or time) is increased or reduced. The data change detecting unit 91 detects a change in sensing data sent from the sensor nodes 10 and sends the detected change to the observation granularity modification policy 92. When the change in sensing data satisfies the observation granularity modification policy 92 being set, the temporal granularity 81 or the spatial granularity 82 is updated according to the policy. When the temporal granularity 81 is modified, Step 4 needs to be performed. When the spatial granularity 82 is modified, Steps 2 to 4 need to be performed.

Through the above-described procedure, the sensor network management capable of automatically modifying the observation granularity can be realized.

INDUSTRIAL APPLICABILITY

This invention can be applied to management of a sensor network, which is a network connecting multiple sensor nodes.

The invention claimed is:

1. A base station for receiving data intermittently sent from multiple sensor nodes, comprising:
   a memory for storing a sensor management table used to manage the multiple sensor nodes and a group management table used to make the multiple sensor nodes into groups;
   a counter value generating circuit which is synchronized with a counter value generating circuit of each of the sensor nodes; and
   an operation timing control unit,
   wherein the operation timing control unit determines, based on an operation interval of each of the groups that include the multiple sensor nodes, an operation interval of each of the multiple sensor nodes included in the group and phase timing of activation of each of the multiple sensor nodes, and notifies the operation interval and the phase timing of activation, which are managed using a counter value generated by the counter value generating circuit, to the multiple sensor nodes.

2. The base station according to claim 1, wherein the operation timing control unit rearranges, when the number of the sensor nodes included in a group of the groups is changed, the operation interval of each of the multiple sensor nodes included in the group and the phase timing of activation of each of the multiple sensor nodes, and notifies the operation interval and the phase timing of activation to each of the multiple sensor nodes included in the group.

3. The base station according to claim 1, wherein:
   the group management table stores, for each group of the groups which have been generated by making the multiple sensor nodes into the groups, the number of the sensor nodes belonging to the group and the operation interval of the group; and
   the sensor management table stores, for each sensor node, the operation interval and the phase timing of activation.

4. The base station according to claim 1, wherein sensor data received from sensor nodes which belong to the same group is outputted as sensor data on an identical observation object.

5. The base station according to claim 1, wherein the operation timing control unit modifies, when a spatial granularity for observation is changed, the group configuration of the sensor nodes according to the changed spatial granularity for observation, and modifies the operation interval of each of the multiple sensor nodes included in a modified group and the phase timing of activation of each of the multiple sensor nodes based on the operation interval of the modified group, and notifies the operation interval and the phase timing of activation to each of the multiple sensor nodes.

6. The base station according to claim 5, further comprising a data change detecting unit, wherein:
   the memory stores an observation granularity modification policy which stores an observation granularity and a condition for modifying an observation granularity; and
   the operation timing control unit determines a grouping method according to the observation granularity modification policy, depending on the amount of change in sensing data sent from the sensor nodes, detected by the data change detecting unit, determines the operation interval of each of the multiple sensor nodes included in each of the groups and the phase timing of activation of each of the multiple sensor nodes, and notifies the operation interval and the phase timing of activation to each of the multiple sensor nodes.

7. The base station according to claim 1, wherein the operation timing control unit modifies, when a temporal granularity for observation is changed, the operation interval of the groups of the sensor nodes according to the changed temporal granularity for observation, and modifies the operation interval of each of the multiple sensor nodes included in a modified group and the phase timing of activation of each of the multiple sensor nodes based on the operation interval of the modified group, and notifies the operation interval and the phase timing of activation to each of the multiple sensor nodes.

8. The base station according to claim 7, further comprising a data change detecting unit, wherein:
   the memory stores an observation granularity modification policy which stores an observation granularity and a condition for modifying an observation granularity; and
   the operation timing control unit determines a grouping method according to the observation granularity modification policy, depending on the amount of change in sensing data sent from the sensor nodes, detected by the data change detecting unit, determines the operation interval of each of the multiple sensor nodes included in each of the groups and the phase timing of activation of each of the multiple sensor nodes, and notifies the operation interval and the phase timing of activation to each of the multiple sensor nodes.

* * * * *